United States Patent
Wang

[11] Patent Number: 6,155,162
[45] Date of Patent: Dec. 5, 2000

[54] BARBECUE RACK

[76] Inventor: Yu-Tzu Wang, 21F-3, No. 189, Sec. 2, Keelung Rd., Taipei, Taiwan

[21] Appl. No.: 09/547,594

[22] Filed: Apr. 11, 2000

[51] Int. Cl.[7] .............................. A47J 37/00; A47J 37/04
[52] U.S. Cl. ..................... 99/421 A; 99/419; 99/421 H
[58] Field of Search ................ 99/339, 340, 419–421 V, 99/426, 444–450; 126/25 R, 9 R

[56] References Cited

U.S. PATENT DOCUMENTS

| | | | |
|---|---|---|---|
| 1,377,043 | 5/1921 | Wilson | 99/421 A |
| 2,317,388 | 4/1943 | Lako, Jr. | 99/421 A |
| 2,608,928 | 9/1952 | McDonnel | 99/421 A |
| 3,848,523 | 11/1974 | Galisz et al. | 99/421 H |
| 3,858,495 | 1/1975 | Gotwalt | 99/421 HH |
| 3,939,761 | 2/1976 | McGinty | 99/421 H |
| 4,112,832 | 9/1978 | Severdia et al. | 99/421 HH |
| 4,158,991 | 6/1979 | Nakashima | 99/421 H |
| 4,583,263 | 4/1986 | Wigley, Jr. | 99/419 |
| 5,007,403 | 4/1991 | Chen | 126/25 R |
| 5,058,493 | 10/1991 | Basek et al. | 99/339 |
| 5,168,798 | 12/1992 | Kristofich et al. | 99/421 H |
| 5,887,513 | 3/1999 | Fielding et al. | 99/421 A |

*Primary Examiner*—Timothy Simone
*Attorney, Agent, or Firm*—Merchant & Gould P.C.

[57] ABSTRACT

A barbecue rack includes a main frame made by continuous line-wiring having a handle extended from one side of the main frame, an insulating plate sleeved to one end of the handle, and two L-shape supporting brackets inversely mounted respectively to opposing lateral sides of the main frame. Each supporting bracket includes a plurality of position holes located in series along a longer leg side thereof and a plurality of insert holes located in series along a bending shorter leg side thereof each the supporting bracket. Each the position hole is arranged to accounting for one respective insert hole. The barbecue rack of the present invention can have two layers of foods roasted at the same time. That is, much food can be roasted at a time by compared to a conventional barbecue frame. Thereby, energy and time required for barbecuing can be substantially saved.

7 Claims, 5 Drawing Sheets

BARBECUE RACK

BACKGROUND OF THE INVENTION

(1) Field of the Invention

The invention relates to a barbecue rack. The barbecue rack includes a main frame having a pair of longitudinal bars for mounting respective L-cross section beams. Each beam includes pairs of a inserting hole and an opposing position hole. By applying the beams, the inserting holes and the position holes, a plurality of piercing sticks for penetrating foods can be firmly and parallel held between the beams.

(2) Description of the Prior Art

The barbecue is a popular leisure activity and is good to be held either indoors or outdoors. The number of people involved in a barbecue is also not limited. Generally speaking, the barbecue is a healthy activity for improving social relationship and friendship. To meet various types of barbecuing, several tooling with different functions and profiles are found in the market. Referring to FIG.4, a conventional barbecue frame is shown. The barbecue frame 1 includes fixed frame 10 and a rotational frame 11 pivotal with the fixed frame 10. The fixed frame 10, made by line wiring, includes a long handle 12 protruding from one side thereof and a pair of supporting bracket 13 mounted along two parallel sides of the fixed frame 10. The supporting bracket 13 includes a plurality of receiving grooves 14, in which the receiving grooves 14 can be equal spaced and have respective opening located at the upper side of the supporting bracket 13. The rotational frame 11 is also a line-wired frame with a short handle 15 protruding from a side and overlapping the long handle 12. Regarding the aforesaid structure, foods 16 to be roasted by the barbecue frame 1 are pierced by a piercing stick 17. The piercing stick 17 has a hoop end 18 and an opposing piercing end 19. The piercing stick 17 is supported by an respective pair of receiving grooves 14 located each at one said supporting bracket 13. The fixed frame 10 and the rotational frame 11 are pivotally connected by a plurality of hooks 20 mounted at the sides opposing to the long handle 12 and the short handle 15, respectively. While the fixed frame 10 and the rotational frame 11 are rotated to overlapping, a hoop 21 can be used to sleeve the long handle 12 and the short handle 15 for integrating both frames 10 and 11 as a unique structure. At the same time of overlapping, the rotational frame 11 can also be used to close the openings of the receiving grooves 14 that supports the piecing sticks 17, so that the piecing stick 17 can be firmly held by the fixed and the rotational frames 10 and 11. Besides, perpendicular legs 22 and 23 can be provided to the rotational frame 11 and the fixed frame 10, respectively, for standing the barbecue frame 1 spaced from a fire at a proper distance to prevent the foods 16 from being burnt black. In addition, an insulating plate 24 can be arranged at the long handle 12 of the fixed frame 10 for avoiding possible burn of hands while in roasting foods 16.

By aforesaid arrangement of the barbecue frame 1, following disadvantages can be found. First of all, when the rotational frame 11 overlaps upon the fixed frame 10, the piecing sticks 17 are theoretically restrained in between. However, in practical, the hooks 20 for pivoting the fixed frame 10 and the rotational frame 11 and the hoop 21 for holding the long handle 12 and the short handle 15 cannot kept in the same horizontal surface. Further, the receiving grooves 14 of the supporting brackets 13 cannot either be manufactured so accurately to accommodate the piecing sticks 17 while meeting the depression of the rotational frame 11. Therefore, as shown in FIG.5, only those piecing sticks 17 located at both ends of the supporting brackets 13 can be firmly depressed inside the receiving grooves 14, and arc shape is formed to every piecing stick 17. Under such a situation, those piecing sticks 17 located at the middle portions of the supporting brackets 13 can only rest inside the receiving grooves 14 but not depressed by the rotational frame 11. Thus, while the barbecue frame 1 is turned over, most of the piecing sticks 17 are likely to be dropped from the receiving grooves 14. Though, some piecing sticks 17 can be held loosely in the barbecue frame 1 due to the foods 16 thereon, it is still possible that the foods 16 will be dropped into the fire due to the inclination of the piecing sticks 17. Another problem of the conventional barbecue frame 1 is happened to the hoop 21. Normally, the hoop 21 can effectively hold the long handle 12 and the short handle 15. However, the user might accidentally handle the barbecue frame 1 at an angle that allows the hoop 21 to slip away. Under such a situation, if the barbecue frame 1 is turned upside down, the rotational frame 11 will rotate away from the fixed frame 10 and let the piecing sticks 17 be fallen from the supporting brackets 13. Inevitably, the foods 16 on the fallen piecing sticks 17 will be contaminated. Disadvantages of the barbecue frame 1 other than the aforesaid two problems include the inconvenience of removing the piecing sticks 17 from the closed fixed and rotational frames 10 and 11 by which repeated opening and closing will inevitably happen to the undone foods 16, the possibility of burn caused by the iron-made frames by which a glove is necessary for operating the rotational frame 11 and the hoop 21, and the possible damage of legs 22 and 23 from the high-temperature application environment of the barbecue frame 1.

SUMMARY OF THE INVENTION

Accordingly, it is a primary object of the present invention to provide a barbecue rack for improving all the aforesaid disadvantages of the conventional barbecue frame, by providing respective L-shape supporting brackets to both lateral sides of a fixed frame, in which the L-shape supporting brackets are inversely arranged. In accordance with the present invention, the L-shape supporting bracket includes pairs of insert holes and position holes located along two longitudinal lateral sides of the supporting bracket. The flexible piecing sticks are supported on the barbecue rack by having two ends to be accommodated inside the respective insert holes and the respective position holes. By providing the holes and the arrangement of the supporting brackets, two layers of piecing sticks can be formed while utilizing the barbecue rack in accordance with the present invention. In the present invention, the barbecue rack also includes 8-shape legs integrated as a unique piece with the barbecue rack.

Because the barbecue rack applies only a main frame, so that the conventional rotational frame can be removed and thus the production cost can be reduced. By such an arrangement, each piecing stick as well as the foods on it can be roasted independently. Because the piecing sticks can be firmly supported by the L-shape supporting brackets, no slippery of the piecing sticks as well as the foods thereon can occur during the rotation of the barbecue rack. Due to two or more layers of piecing sticks can be formed on the barbecue rack of the present invention, the efficiency of roasting can be substantially increased; so that the roast time and the required energy for preparing the foods can be reduced. The integrated legs will also resolve the damage problem of welded legs in the conventional design. Further, due to the one-piece design of the barbecue rack of the present invention, a handle for operating the barbecue rack can be away from burning the users. All of these advantages of the barbecue rack in accordance make a barbecue activity a real leisure lifestyle.

All these objects are achieved by the paper-loading mechanism for a document duplicating machine described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a barbecue rack. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
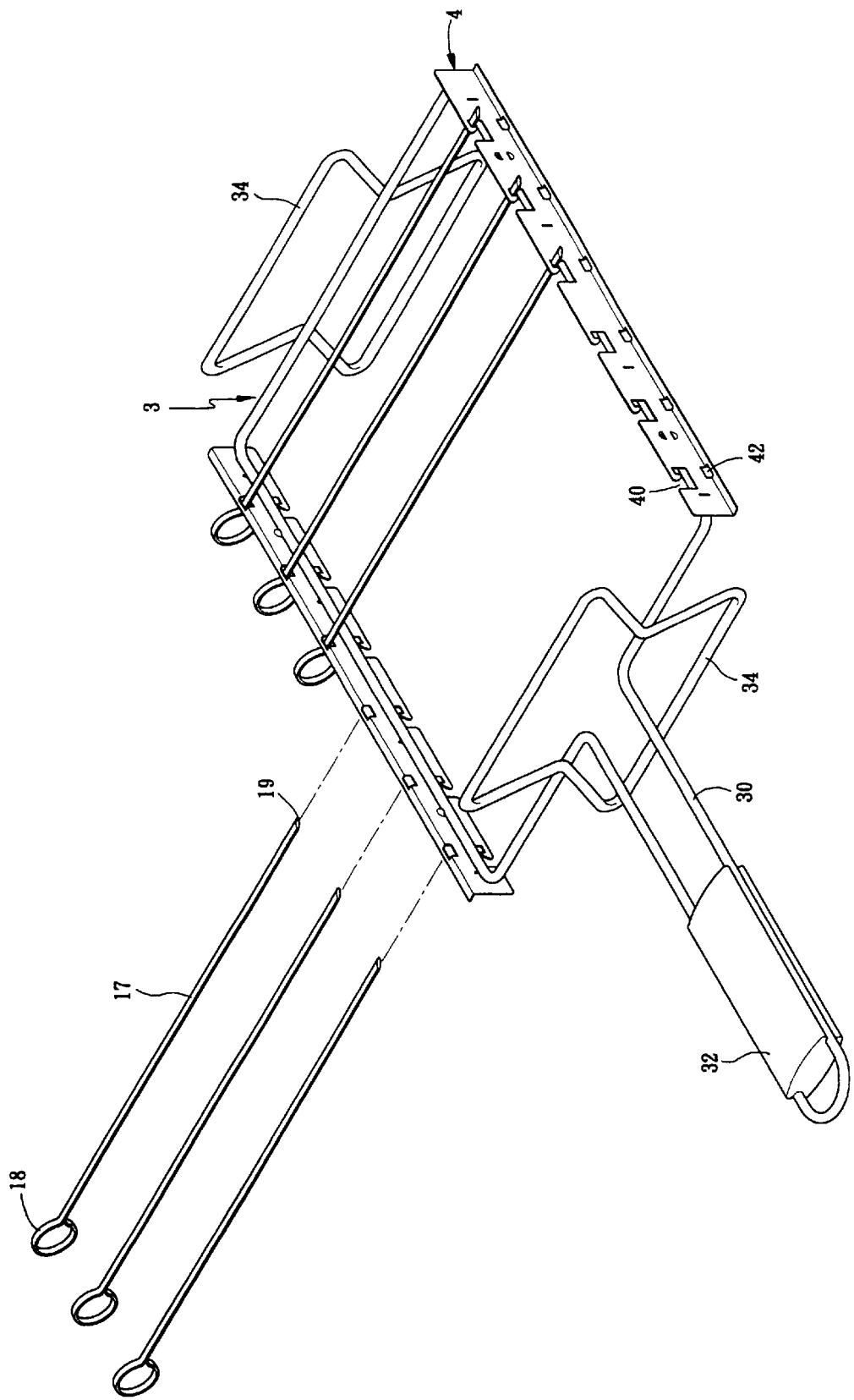
FIG. 1 is a perspective view of a preferred barbecue rack in accordance with the present invention, in which some piecing sticks are shown at its separate position away from the barbecue rack.

Referring now to FIG. 1, a preferred embodiment of the barbecue rack in accordance with the present invention is shown. The barbecue rack includes a main frame 3 made by bending a unique wire. One side of the main frame 3 is protrusively profiled as a handle 30. A insulating plate 32 can be sleeved onto one end of the handle 30. At two opposite sides of the main frame 3, respective 8-shape of legs 34 perpendicular to the main frame 3 are formed. Two L-shape supporting brackets 4 are mounted to another two opposite sides of the main frame 3, respectively. These two L-shape supporting brackets 4 are inversely arranged. Each supporting bracket 4 includes equal-spacedly a plurality of position holes 40 located in series along one lateral side of the supporting bracket 4 and a plurality of insert holes 42 in series along another lateral side thereof. As shown in FIG. 1, the position holes 40 are arranged at the longer-leg side of the L-shape supporting bracket 4, and the insert holes 42 are arranged along the bend of the L-shape supporting bracket 4. In addition, the conventional piecing sticks 17 can also be applied in the barbecue rack of the present invention.

Figure 2:
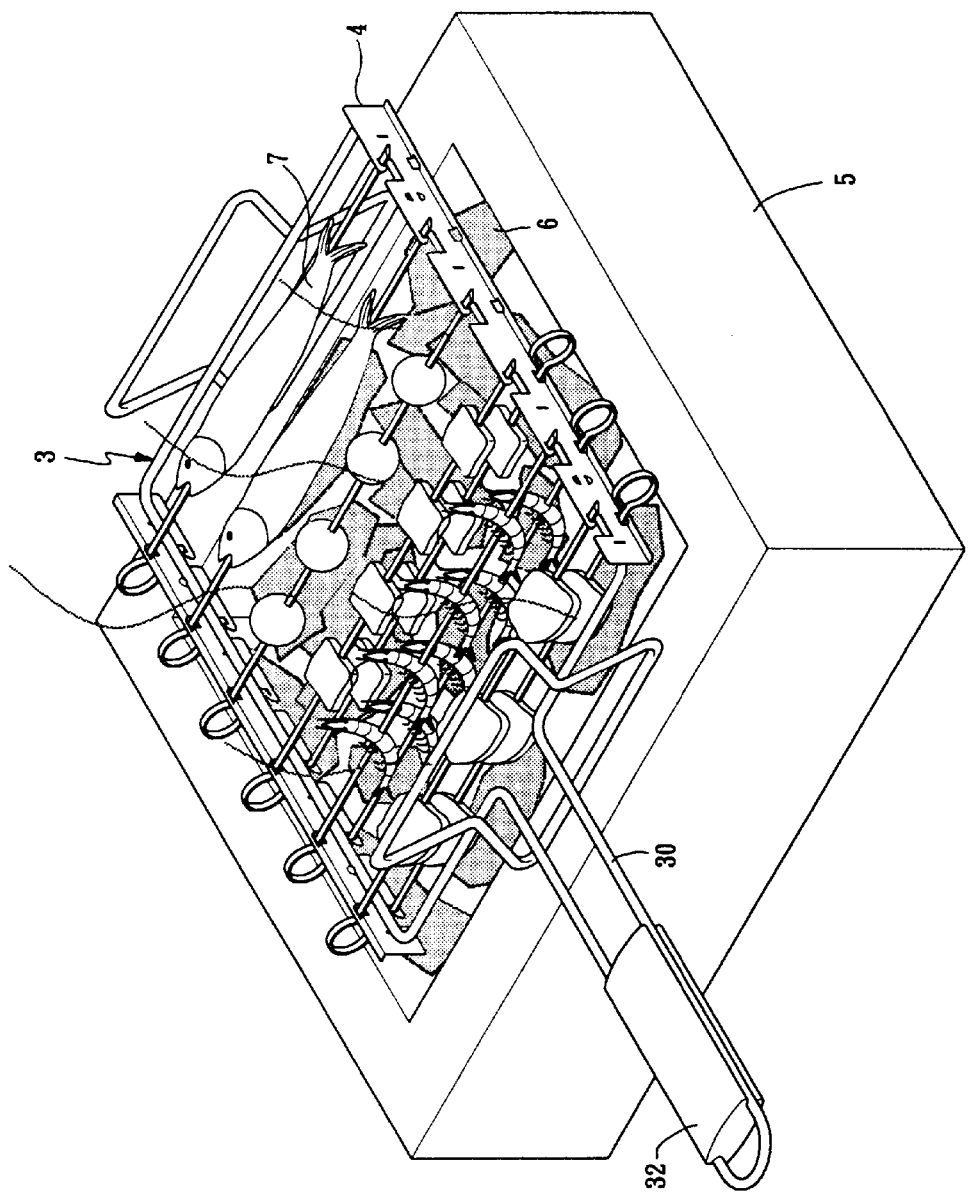
FIG. 2 is a perspective view showing the preferred barbecue rack operated on a fire.
Figure 3A:
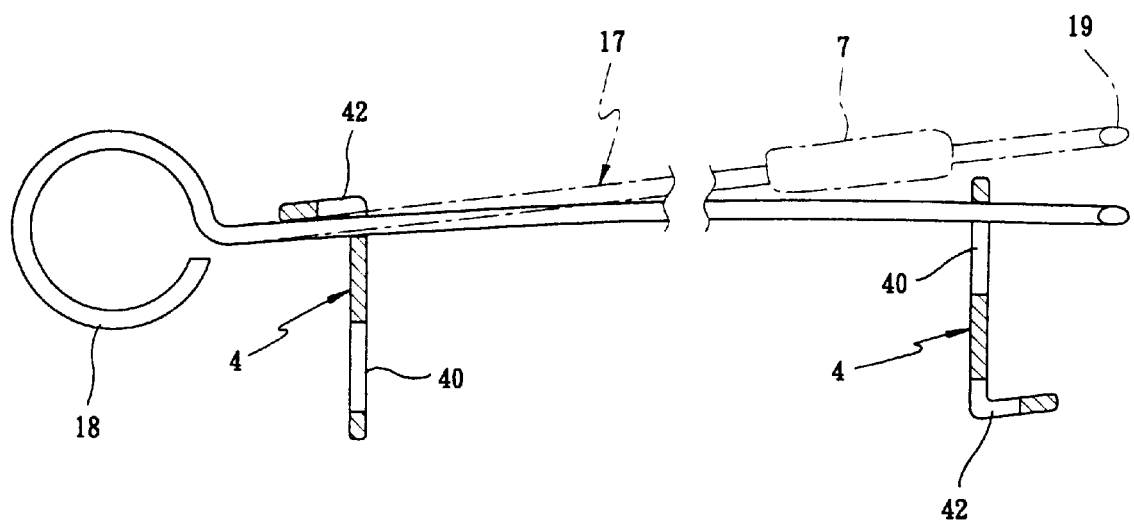
FIG. 3A is a lateral view showing the piecing stick located by the L-shape supporting brackets.
Figure 3B:
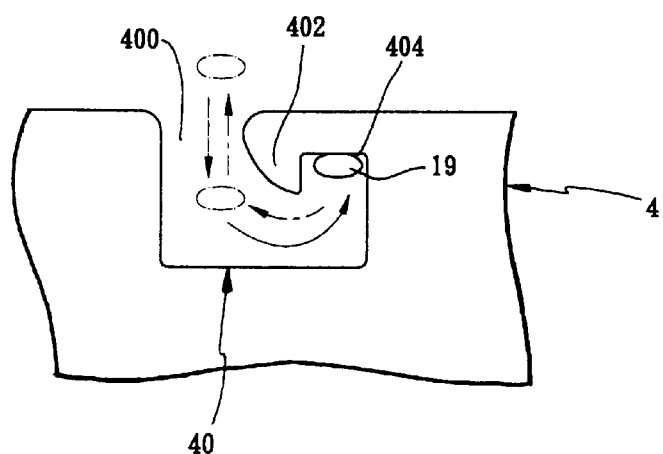
FIG. 3B is another lateral view showing the piecing stick located by the L-shape supporting brackets.
Figure 4:
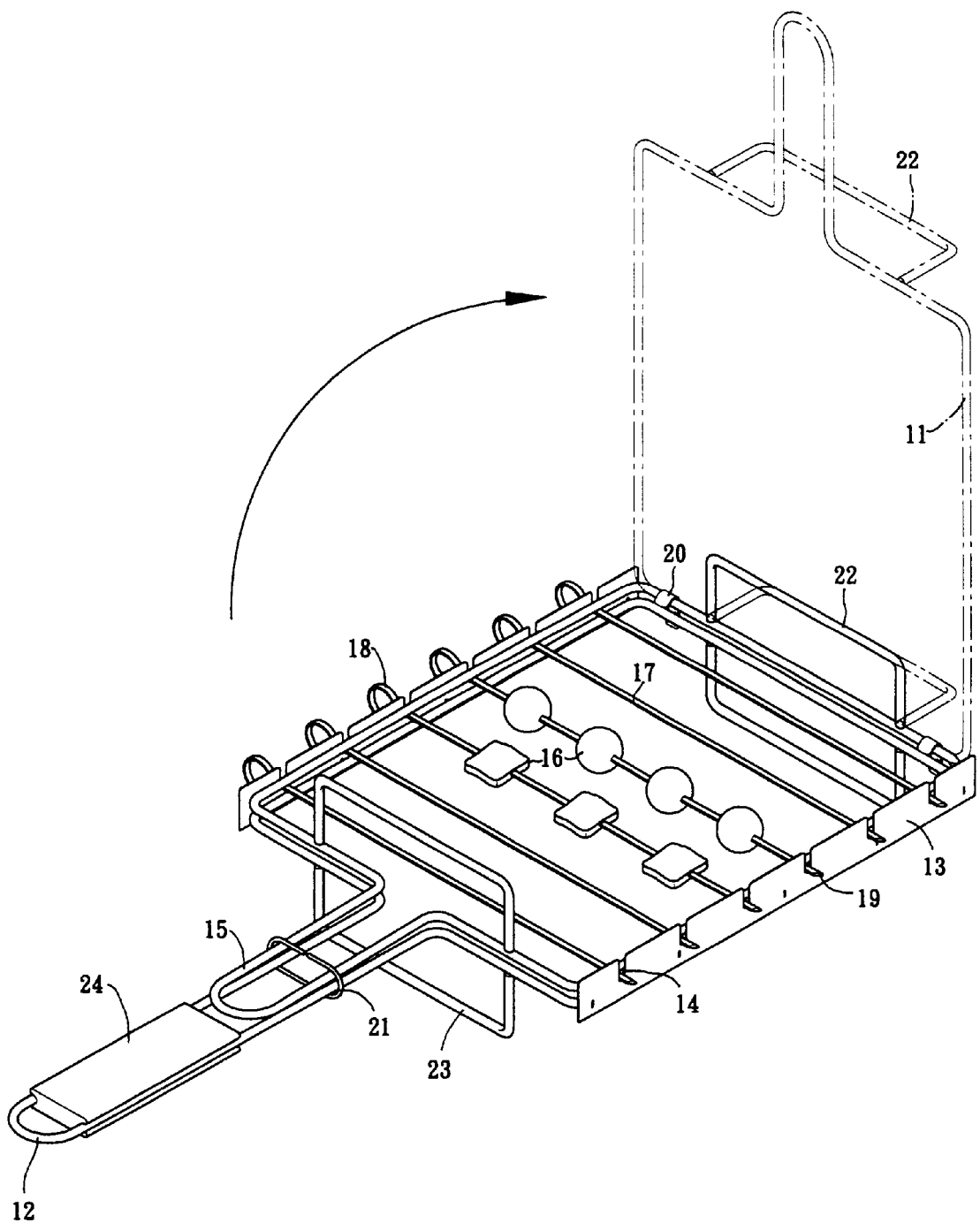
FIG. 4 is a perspective view of a conventional barbecue frame.
Figure 5:
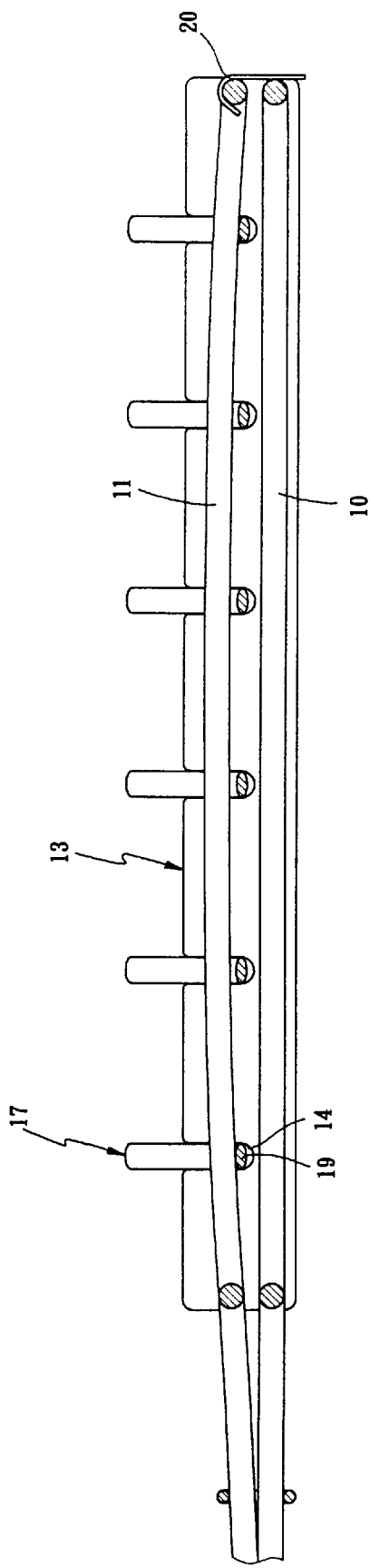
FIG. 5 is a lateral view showing the piecing sticks being restrained by overlapping the rotational frame upon the fixed frame of the conventional barbecue frame.

The operation of the barbecue rack according to the present invention can be referred to FIG. 2, FIG. 3A and FIG. 3B. While in statically roasting, the legs 34 can be used to stand the barbecue rack by a distance over a furnace plate 5 for preventing the fire 6 from directly burning the foods. While in dynamically roasting, the insulating plate 32 of the handle 30 can be effectively used to prevent the user from being burned. One of the characteristics of the present invention is the engagement between the supporting brackets 4 and the piecing sticks 17. As shown in FIG. 3A and FIG. 3B, the shorter side 44 of supporting bracket 4 is slightly inclined to the longer side 46. While one end of the piecing stick 17 is moved into to the respective insert hole 42, the piecing stick 17 will be raised upward by the inclined shorter side 44. Upon such an arrangement, a room is generated among the piecing stick 17, the main frame 3 and the supporting bracket 4 for allowing the food 7 to be set on the piecing stick 17. After the foods 7 are well arranged in series on the piecing stick 17, the tip end 19 of the piecing stick 17 can be forced into the position hole 40 of the supporting bracket 4 through an end opening 400 of the position hole 40. The tip end 19 is then moved for being anchored into a cavity 404 at a side of a hook portion 402 adjacent to the end opening 400 of the position hole 40. Due to the slender ratio of the piecing stick 17, enough flexibility can be provided to the piecing stick 17 so that the tip end 19 can be flipped and firmly anchored into the cavity 404 of the position hole 40 during setting the piecing stick 17. Also, in the cavity 404, the piecing stick 17 is at a state of local stability between two supporting brackets 4. By such an arrangement, no food dropping 7 or loosen piecing stick 17 can occur during rotating the barbecue rack of the present invention. Further, while the foods 7 on a particular piecing stick 17 are well done, the piecing stick 17 as well as the foods 7 can be easily removed by lifting slightly the hoop end 18 of the piecing stick 17 to have the tip end 19 leaving the cavity 404 as well as the position hole 40, so that the tip end 19 can be free from the barbecue rack for any replacement of the foods 7. Obviously, such food replacement operation of the barbecue rack in accordance with the present invention is superior to that of the conventional barbecue frame.

Another characteristics of the present invention is the inverse arrangement of these two supporting bracket 4. By this arrangement, a position hole 40 and an insert hole 42 at one supporting bracket 4 are respectively accounting to an insert hole 42 and a position hole 40 at another supporting bracket 4. Also, by such an arrangement, two layers of piecing sticks 17 can be formed in the barbecue rack; i.e. double amount of food 7 can be roasted at a time by compared to a conventional barbecue frame. Thereby, energy and time required for barbecuing can be substantially saved.

While the present invention has been particularly shown and described with reference to a preferred embodiment, it will be understood by those skilled in the art that various changes in form and detail may be without departing from the spirit and scope of the present invention.

I claim:

1. A barbecue rack, comprising a main frame made by continuous line-wiring having a handle extended from one side of the main frame, an insulating plate sleeved to one end of the handle, two legs mounted respectively perpendicular to two opposing lateral sides of the main frame, two supporting brackets mounted respectively to another opposing lateral sides of the main frame, and a plurality of separate piecing sticks that each of the piecing sticks has a hoop end and another tip end, characterized on that: each supporting bracket is an L-shape beam, a plurality of position holes located in series along a longer leg side of each the supporting bracket, a plurality of insert holes located in series along a bending shorter leg side of each the supporting bracket, and each the position hole is arranged to account for one respective insert hole.

2. The barbecue rack according to claim 1, wherein said supporting brackets are inversely mounted for letting each said position hole at one said supporting bracket account for one respective said insert hole at another said supporting bracket.

3. The barbecue rack according to claim 1, wherein said shorter leg side is inclined toward to said longer leg side.

4. The barbecue rack according to claim 1, wherein said position hole of said supporting bracket includes an end opening, a hook portion adjacent to the end opening and a cavity at a side of the hook portion.

5. The barbecue rack according to claim 4, wherein said tip end and said hoop end of said piecing stick are applied to said insert hole at one said supporting bracket and said cavity of said position hole at another said supporting bracket.

6. The barbecue rack according to claim 1, wherein said supporting brackets are capable of mounting two layers of said piecing sticks.

7. The barbecue rack according to claim 1, wherein said leg of said main frame is an 8-shape part made by continuous line wiring.

\* \* \* \* \*